United States Patent
Joseph et al.

(10) Patent No.: US 8,081,691 B2
(45) Date of Patent: Dec. 20, 2011

(54) DETECTION OF INTERFERERS USING DIVERGENCE OF SIGNAL QUALITY ESTIMATES

(75) Inventors: Brian Chadwick Joseph, McKinney, TX (US); Sridhar Rajagopal, Plano, IN (US); Syed Nadeem Ahmed, Allen, TX (US); Yaming Zhang, Plano, TX (US)

(73) Assignee: QUALCOMM Incorporated, San Diego, CA (US)

( * ) Notice: Subject to any disclaimer, the term of this patent is extended or adjusted under 35 U.S.C. 154(b) by 921 days.

(21) Appl. No.: 12/014,035

(22) Filed: Jan. 14, 2008

(65) Prior Publication Data
US 2009/0180521 A1 Jul. 16, 2009

(51) Int. Cl.
*H04K 1/10* (2006.01)
(52) U.S. Cl. ........ 375/260; 375/296; 375/299; 375/346; 375/347; 375/348; 375/349
(58) Field of Classification Search .......... 375/260, 375/296, 299, 346, 347, 348, 349
See application file for complete search history.

(56) References Cited

U.S. PATENT DOCUMENTS

| | | | |
|---|---|---|---|
| 6,983,030 B2 | 1/2006 | Storm et al. | |
| 7,221,911 B2 | 5/2007 | Knobel et al. | |
| 7,313,190 B2 | 12/2007 | Balakrishnan et al. | |
| 2003/0104797 A1* | 6/2003 | Webster et al. | 455/296 |
| 2003/0185147 A1* | 10/2003 | Taga et al. | 370/210 |
| 2003/0231715 A1 | 12/2003 | Shoemake et al. | |
| 2004/0001563 A1 | 1/2004 | Scarpa | |
| 2004/0077306 A1 | 4/2004 | Shor et al. | |
| 2004/0141548 A1 | 7/2004 | Shattil | |
| 2004/0151109 A1 | 8/2004 | Batra et al. | |
| 2005/0013387 A1 | 1/2005 | Ojard | |
| 2005/0018750 A1 | 1/2005 | Foerster et al. | |
| 2005/0047444 A1 | 3/2005 | Park et al. | |
| 2005/0135229 A1 | 6/2005 | Molisch et al. | |
| 2005/0164642 A1 | 7/2005 | Roberts | |
| 2005/0190817 A1 | 9/2005 | Batra | |
| 2005/0201287 A1 | 9/2005 | Welborn | |
| 2005/0232137 A1 | 10/2005 | Hosur et al. | |
| 2005/0265221 A1 | 12/2005 | Batra et al. | |
| 2005/0276353 A1 | 12/2005 | Bobier et al. | |
| 2006/0008035 A1 | 1/2006 | Larsson | |

(Continued)

OTHER PUBLICATIONS

Viterbi, Andrew J., "Error Bounds for Convolutional Codes and an Asymptotically Optimum Decoding Algorithm", IEEE Transactions on Information Theory, vol. IT-13, No. 2, Apr. 1967, pp. 260-269.

(Continued)

*Primary Examiner* — Kabir A Timory
(74) *Attorney, Agent, or Firm* — Nicholas J. Pauley; Peter M. Kamarchik; Jonathan T. Velasco (57) ABSTRACT

A method, system, and computer-readable medium for detecting an interferer in a wireless communication system are provided. The method includes receiving a signal having P tones, each of the P tones being associated with a frequency, determining a first signal quality of each of the P tones, determining a second signal quality of each of the P tones, and detecting the interferer that occupies the same frequency as one of the P tones based on the respective first signal quality and the respective second signal quality. The first signal quality and second signal quality behave differently when the interferer is present. The detecting the interferer includes determining a discrepancy in the behavior of the first signal quality and the second signal quality.

20 Claims, 10 Drawing Sheets

U.S. PATENT DOCUMENTS

| | | | |
|---|---|---|---|
| 2006/0039346 A1 | 2/2006 | Shapiro | |
| 2006/0133451 A1 | 6/2006 | Birru | |
| 2006/0171445 A1 | 8/2006 | Batra et al. | |
| 2006/0211377 A1 | 9/2006 | Shoemake et al. | |
| 2007/0291636 A1 | 12/2007 | Rajagopal | |
| 2008/0003954 A1 | 1/2008 | Matsuno | |
| 2008/0013500 A1* | 1/2008 | Laroia et al. | 370/338 |
| 2008/0069255 A1 | 3/2008 | Balakrishnan et al. | |
| 2008/0310565 A1* | 12/2008 | Abbott et al. | 375/348 |

OTHER PUBLICATIONS

Weinstein, S. B. et al., "Data Transmission by Frequency-Division Multiplexing Using the Discrete Fourier Transform", IEEE Transactions on Communication Technology, vol. Com-19, No. 5, Oct. 1971, pp. 628-634.

Office Action mailed Aug. 19, 2008 in U.S. Appl. No. 11/226,654, filed Sep. 14, 2005.

* cited by examiner

DETECTION OF INTERFERERS USING DIVERGENCE OF SIGNAL QUALITY ESTIMATES

BACKGROUND

Orthogonal Frequency Division Multiplexing (OFDM) is a form of wireless multi-carrier modulation wherein carrier spacing is selected so that each subcarrier is orthogonal to the other subcarriers. This orthogonality avoids adjacent channel interference and prevents the demodulators from seeing frequencies other than their own. The benefits of OFDM are high spectral efficiency, resiliency to Radio Frequency (RF) interference, and lower multi-path distortion.

In OFDM the sub-carrier pulse used for transmission is chosen to be rectangular. This has the advantage that the task of pulse forming and modulation can be performed by a simple Inverse Discrete Fourier Transform (IDFT) which can be implemented very efficiently as an Inverse Fast Fourier Transform (IFFT). Therefore, the receiver only needs a FFT to reverse this operation.

Incoming serial data is first converted from serial to parallel and grouped into x bits each to form a complex number. The number x determines the signal constellation of the corresponding sub-carrier, such as 16 Quadrature Amplitude Modulation (QAM). The complex number are modulated in a baseband fashion by the IFFT and converted back to serial data for transmission. A guard symbol is inserted between symbols to avoid inter-symbol interference (ISI) caused by multi-path distortion. The discrete symbols are converted to analog and low-pass filtered for RF up-conversion. The receiver then simply performs the inverse process of the transmitter.

OFDM forms the basis for the Digital Audio Broadcasting (DAB) standard in the European market as well as the basis for the global Asymmetric Digital Subscriber Line (ADSL) standard. Development is ongoing for wireless point-to-point and point-to-multipoint configurations for Wireless Local Area Networks using OFDM technology. In a supplement to the IEEE 802.11 standard, the IEEE 802.11 working group published IEEE 802.11a, which outlines the use of OFDM in the 5.8-GHz band.

In a packet communication system, data that is communicated is first grouped into packets of data, and the data packets, once formed, are then communicated, sometimes at discrete intervals. Once delivered to a receiving station, the information content of the data is ascertained by concatenating the information parts of the packets together. Packet communication systems generally make efficient use of communication channels as the communication channels need only to be allocated pursuant to a particular communication session only for the period during which the data packets are communicated. Packet communication channels are sometimes, therefore, shared communication channels that are shared by separate sets of communication stations between which separate communication services are concurrently effectuated.

A structured data format is set forth in the present promulgation of the operating specification. The data format of a data packet formed in conformity with standards, such as the WiMedia or ECMA-368/369, includes a preamble part and a payload part. Other packet communication systems analogously format data into packets that also include a preamble part and a payload part. The payload part of the packet contains the information that is to be communicated. That is to say, the payload part is non-determinative. Conversely, the preamble part of the data packet does not contain the informational content that is to be communicated but, rather, includes determinative data that is used for other purposes. In particular, the preamble part of an WiMedia or ECMA-368/369 packet preamble includes three parts, a packet sync sequence, a frame sync sequence, and a channel estimation sequence. The packet sync sequence is of a length of twenty-one OFDM symbols, the frame sync sequence is of a length of three OFDM symbols, and the channel estimation sequence is of a length of six OFDM symbols. Collectively, the sequences are of a time length of 9,375 microseconds.

Of particular significance, the preamble also is used for channel estimation. The radio channel upon which the packet is communicated undergoes reflections and is otherwise distorted during its communication to the receiving station. To receive the transmitted data correctly, the receiving station must be provided with a good estimate of the channel to permit proper compensation to be made of the channel. The channel estimation sequence is a known waveform that tells the receiver what the channel looks like. From this known waveform, the receiver can properly compensate the channel to help decode the unknown data sequences.

Ultra-wideband (UWB) includes technology having a bandwidth larger than 500 MHz or 25 percent of a center frequency. Contemporary interest exists in development of wireless versions of serial technologies, such as universal serial bus (USB), capable of UWB transmission rates due to the proliferation of USB-adapted devices in various computational and media systems.

UWB systems spread transmit energy across a wide bandwidth, some of which is occupied by other licensed users. To abide by the rules of government regulatory bodies such as the Federal Communications Commission (FCC), UWB systems may require a method for automatic detection of these other users ("victim service") of the band and then avoid transmitting over those users. This concept is commonly referred to as Detect and Avoid (DAA). As referred to herein, a victim service comprises transmissions of a device in a licensed band. The licensed band may be shared among non-licensed systems, such as UWB systems. Accordingly, the victim service may require preferential transmission rights when the device operating on the licensed spectrum contends with devices operating, at least in part, on the same spectrum in an unlicensed usage. More generally, a victim service may refer to any transmission of a device having a preferential spectrum usage right with respect to another device.

Narrowband systems such as Bluetooth® have provided interference mitigation by using frequency hopping as a means of robustness to avoid interference from IEEE 802.11b systems that share the same unlicensed band. However, ultra-wideband systems occupy bandwidth involving several GHz and hence can interfere with multiple licensed services.

For OFDM-based UWB systems, state of the art techniques have proposed the use of the Fourier Fast Transform in order to detect the interferers if the interferer is seen above a certain detection threshold in the frequency domain. However, several issues complicate the detection process such as the time-varying nature of the victim service, the bandwidth, the effect of the victim service at null tones such as the DC tone or at band edges, and the power level.

Therefore, it would be desirable to have a method for detecting interferers that can handle the complexity of ultra wideband interference.

SUMMARY OF THE INVENTION

In accordance with embodiments disclosed herein, a method for detecting an interferer in a wireless communication system is provided. The method includes receiving a signal having a plurality of P tones, each of the P tones being associated with a frequency, determining a respective first signal quality for each of the P tones, determining a respective second signal quality for each of the P tones, and detecting the interferer that occupies the same frequency associated with one of the P tones based on the respective first signal quality and the respective second signal quality. The first signal quality and second signal quality behave differently when the interferer is present. The detecting the interferer includes determining a discrepancy in the behavior of the first signal quality and the second signal quality. The disclosure applies to any communication system where a signal quality metric can be measured in two or more ways. The important thing is to select two quality metrics that behave differently in the presence of an interferer and look for discrepancies in the behavior of these two metrics. Discrepancies indicate the presence of an interferer. Error vector magnitude (EVM) and channel response (CR) are just examples of signal quality metrics that behave differently in the presence of an interferer.

Also, a computer-readable medium having instructions for detecting an interferer in a wireless communication system is provided. The instructions include instructions that receive a signal having a plurality of P tones, each of the P tones being associated with a frequency, instructions that determine a respective first signal quality for each of the P tones, instructions that determine a respective second signal quality for each of the P tones, and instructions that detect the interferer that occupies the same frequency associated with one of the P tones based on the respective first signal quality and the respective second signal quality. The first signal quality and second signal quality behave differently when the interferer is present. The instructions that detect the interferer include instructions that determine a discrepancy in the behavior of the first signal quality and the second signal quality.

Further, a system for detecting an interferer in an ultra wideband system is provided. The system includes an antenna adapted to receive an OFDM signal having a plurality of P tones, each of the P tones being associated with a frequency, a Fast Fourier Transform (FTT) module adapted to translate the received signal into a frequency domain, a demodulator for demodulating the translated signal, the demodulator providing a respective first signal quality of each of the P tones and a respective second signal quality of each of the P tones, and a detection module configured to detect an interferer that occupies the same frequency associated with one of the P tones if a corresponding normalization value exceeds a threshold, the normalization value being a function of the first signal quality and second signal quality.

BRIEF DESCRIPTION OF THE DRAWINGS

Aspects of the present disclosure are best understood from the following detailed description when read with the accompanying figures, in which:

FIG. 5 is a diagrammatic representation of frequency bands among which the UWB system of FIG. 1 may operate in;

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
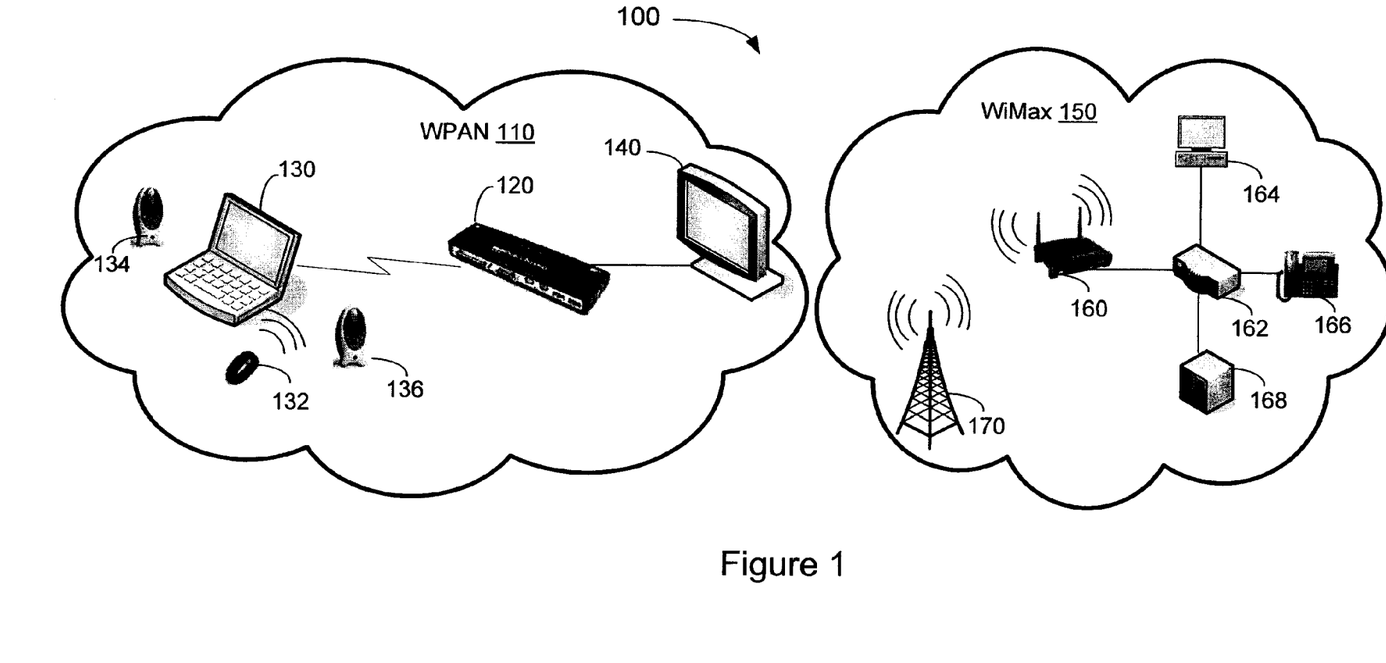
FIG. 1 is a diagrammatic representation of a system including an ultra wideband (UWB) system in which embodiments disclosed herein may be implemented.

FIG. 1 is a diagrammatic representation of a network system 100 in which embodiments disclosed herein may be implemented. The network system 100 may comprise a wireless personal area network (WPAN) 110 implemented as an ultra wideband (UWB) system. In the illustrative example, the WPAN 110 includes a wireless docking station 120 that facilitates communication of various peripheral wireless devices, e.g., a wireless mouse 132 and speakers 134-136, with a wireless laptop 130. One or more devices, such as a display device 140, may be physically coupled with wireless router 120. The WPAN 110 provides for communications among the various WPAN devices and may additionally interface with higher level networks, e.g., the Internet. Typical ranges of WPAN are very limited, such as a few meters. One or more devices within the WPAN 110 may wirelessly transmit OFDM modulated data. Devices in the WPAN 110 may include a OFDM subsystem adapted for OFDM modulation for transmission within the WPAN. In an embodiment, the OFDM subsystem may be included in an UWB system that effects communications over an unlicensed radio spectrum.

The system 100 may additionally include any number of other network systems, such as a WiMax system 150. The WiMax system 150 provides for wireless data transmissions over relatively large distances. In the illustrative example, the WiMax system 150 includes a wireless radio 160 that may interface with a router 162 or other layer 3 switch. Various devices may interconnect with router 162, such as a computer system 164, an Internet Protocol (IP) telephony device 166, and an IP private branch exchange (PBX) 168. The wireless radio 160 may communicate with a WiMax hub site 170 over an air interface. The hub site 170 may connect with an IP core network (not shown), e.g., via an aggregation switch, router, or other suitable infrastructure.

The WiMax system 150 may operate in a licensed band that overlaps with usable spectrum of the WPAN 110. Thus, the WiMax system 150 may at times be in contention with radio resources of the WPAN 110, and the WPAN 110 and WiMax system 150 may mutually interfere with one another. In instances where the WiMax 150 and WPAN 110 attempt access to a shared radio interface, the WiMax system 150 may be referred to as a victim service interferer. In accordance with embodiments disclosed herein, the WPAN 110 is provided with mechanisms that facilitate detection and avoidance of a victim service interferer.

Figure 2:
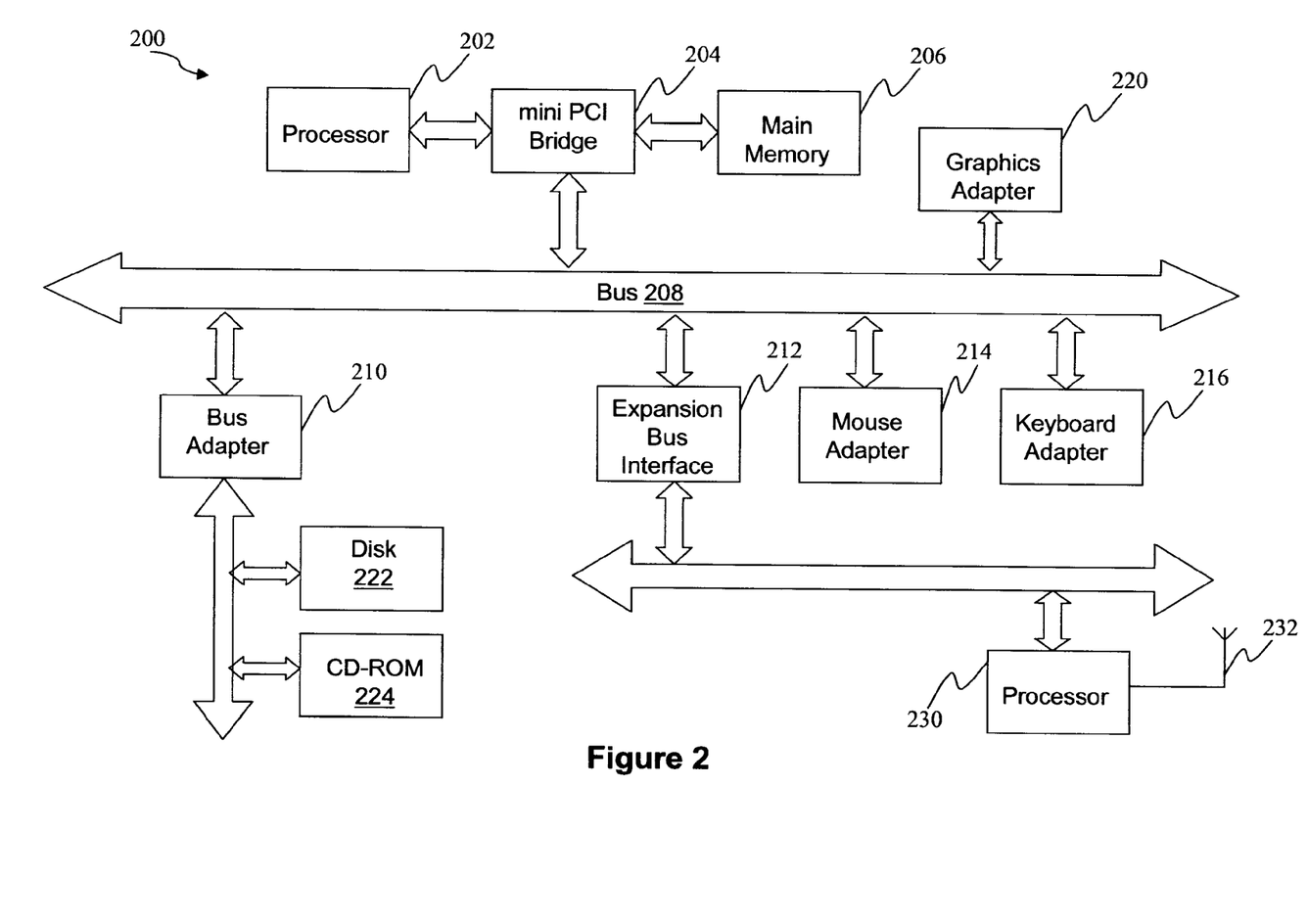
FIG. 2 is a block diagram of an exemplary data processing system in which embodiments disclosed herein may be implemented.

FIG. 2 is a block diagram of an exemplary data processing system 200, such as the wireless laptop 130 depicted in FIG. 1, in which embodiments disclosed herein may be implemented. Code or instructions implementing processes of embodiments disclosed herein may be located or accessed by the system 200. In the illustrative example, the system 200 employs a mini PCI bus architecture, although other bus architectures may be used. A processor system 202 and a main memory 206 are connected to a local bus 208 through a bridge 204. The bridge 204 also may include an integrated memory controller and cache memory for a processor 202. Additional connections to local bus 208 may be made through direct component interconnection or through add-in connectors.

In the depicted example, a small computer system interface (SCSI) host bus adapter 210, an expansion bus interface 212, a mouse adapter 214, a keyboard adapter 216, and a graphics adapter 218 are connected to local bus 208 by direct component connection. In contrast, a UWB subsystem 230 may be connected to local bus 208 via expansion bus interface 212 by add-in boards inserted into expansion slots. Alternatively, the UWB subsystem 230 may directly connect with bus 208. In the preset example, the UWB subsystem 230 provides an interface for connecting the system 200 with other devices, e.g., a wireless hub or router, a wireless docking station, or the like, via a radio antenna 232. The SCSI host bus adapter 210 provides a connection for a hard disk drive 222, and a CD-ROM drive 224. Typical mini PCI local bus implementations may support a plurality of PCI expansion slots or add-in connectors.

An operating system runs on the processor 202 and is used to coordinate and provide control of various components within the system 200. Instructions for the operating system and applications or programs are located on storage devices, such as hard disk drive 222, and may be loaded into the main memory 206 for execution by the processor 202.

In accordance with embodiments disclosed herein, the UWB subsystem 230 may be deployed in the data processing system 200 and facilitates detection and avoidance of victim service interferers in other systems. In the event the interferer is detected, the UWB subsystem 230 may suppress transmissions on one or more sub-carriers associated with the detected interferer as described more fully hereinbelow.

Figure 3:
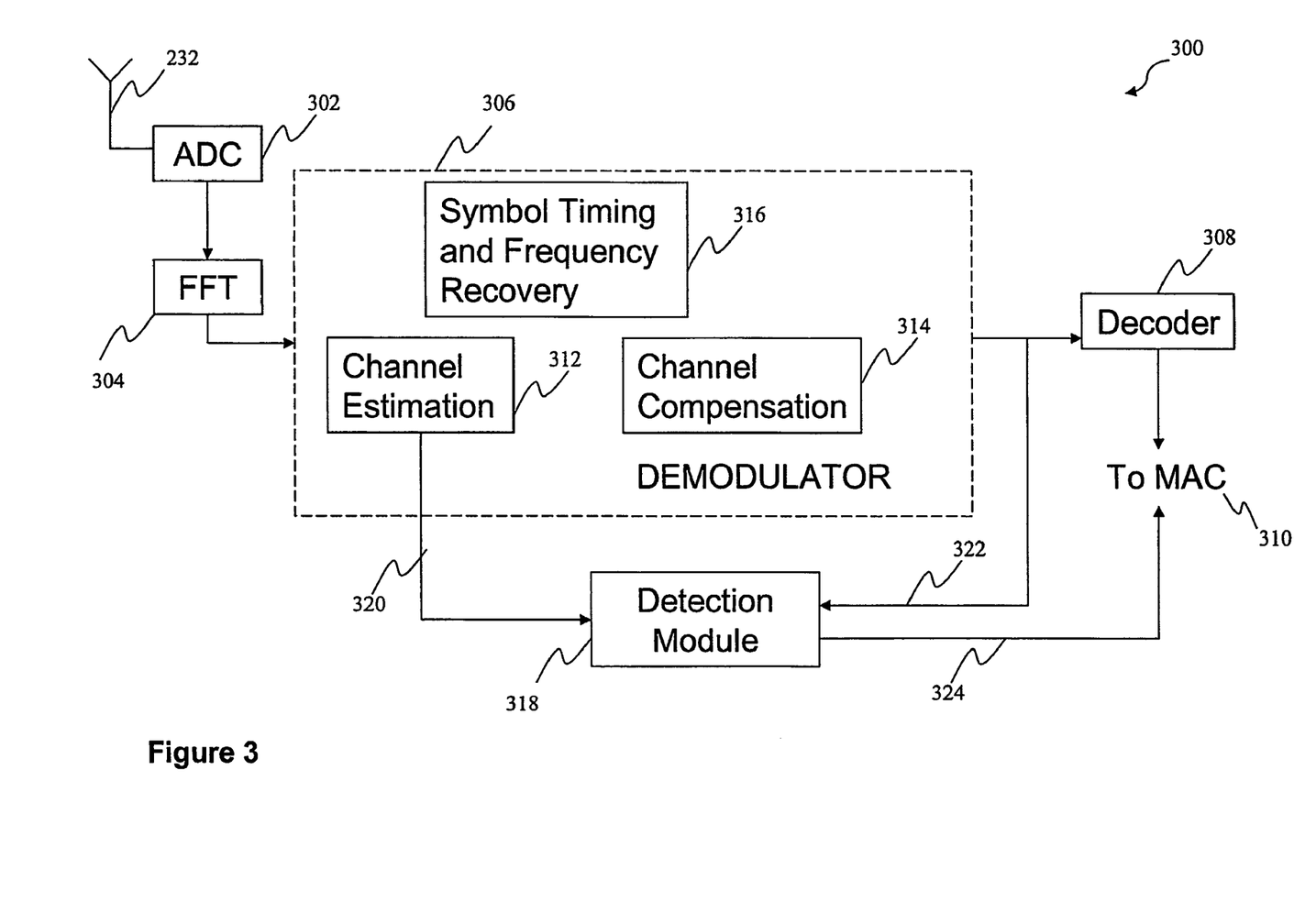
FIG. 3 is a block diagram of an OFDM receiver subsystem that may be implemented in the data processing system of FIG. 2 in accordance with an embodiment.

FIG. 3 is a block diagram of an OFDM receiver subsystem 300 that may be implemented in the data processing system 200 in accordance with an embodiment. For example, the receiver subsystem 300 may be implemented in the UWB subsystem 230 of FIG. 2. Similar features in FIGS. 2 and 3 are numbered the same for clarity. In the present example, the receiver subsystem 300 includes an antenna 232 that is coupled with an analog-to-digital conversion (ADC) module 302 that samples and digitizes a received signal, such as an OFDM signal having a plurality of sub-carriers (also referred to as "tones"). The digitized signal may be amplified or attenuated, and the signal is provided to a Fast Fourier Transform (FFT) module 304. The FFT module 304 translates the signal from the time domain to a frequency domain (i.e., frequency bins), and the translated signal is provided to a demodulator 306. The FFT module 304 outputs parallel bit streams to the demodulator 306. The demodulator 306 demodulates the translated signal and provides the demodulated signal to a decoder 308. The decoder 308 decodes the signal and outputs a serial bit stream to a Medium Access Control (MAC) layer 310 for processing. The MAC Layer 310 may comply with standards such as WiMedia or ECMA-368/369. Various other components or functions, such as quadrature mixers and low-pass filters, may be included in the OFDM receiver subsystem 300, and the depiction of the receiver subsystem is simplified to facilitate a better understanding of the disclosed embodiments.

The demodulator 308 includes a channel estimation block 312, a channel compensation block 314, and a symbol timing and frequency recovery block 316. It is understood that the demodulator 308 may further include other functional blocks but is simplified for a better understanding of the disclosed embodiment. The channel estimation block 312 provides an estimate of the channel so that adequate compensation can be made to the channel via the channel compensation block 314. The radio channel upon which the packet is communicated undergoes reflections and is otherwise distorted during its communication to the receiver subsystem 300. To receive the transmitted data correctly, the receiver subsystem 300 is provided with a good estimate of the channel to permit proper compensation to be made of the channel. The channel estimation sequence is a known waveform that tells the receiver subsystem 300 what the channel looks like. The symbol timing and frequency recovery block 316 recovers the symbol timing delay and frequency (sub-carrier) offset of the received signal for proper timing and frequency synchronization.

The receiver subsystem 300 further includes a detection module 318 for detecting a victim service interferer within the UWB system. The channel estimation block 312 provides an output 320 to the detection module 318. The output 320 includes an estimate of a (multipath) channel frequency response magnitude (referred to as "|CR|") for each OFDM sub-carrier. The demodulator 308 provides an output 322 to the detection module 318. The output 322 includes an error vector magnitude (referred to as "EVM") for each OFDM sub-carrier. The EVM is a measure of the error of the received signal typically due to noise, and thus $EVM^2$ is a measure of the noise power. The EVM varies across the sub-carriers (tones) due to multipath. The EVM and CR for each OFDM sub-carrier are estimated independently. The detection module 308 processes this information using an algorithm to detect whether an interferer is present (occupying the same frequency as the OFDM sub-carrier) as will be described in detail later.

In the absence of an interferer, the noise power ($EVM^2$) is inversely proportional to a signal-to-noise ratio (referred to as "SNR") calculated from the channel frequency response magnitudes (|CR|). The SNR is proportional to $|CR|^2$, and thus $EVM^2$ is inversely proportional to $|CR|^2$. Accordingly, a normalized EVM function (referred to as "NEVM") equals $EVM^2 * |CR|^2$. Therefore, in the absence of an interferer, the NEVM function becomes a constant value across frequency (i.e., all OFDM sub-carriers).

In the presence of an interferer, the EVM will increase. However, the |CR| does not necessarily increase or decrease. This results in a peak in the NEVM function for those OFDM sub-carriers that occupy the same frequency as the interferer. Accordingly, the NEVM for each sub-carrier is compared to a threshold to determine whether or not an interferer is present. The threshold is determined by adding a fixed threshold offset to a mean of the NEVM function across frequency. Thus, if the NEVM of one or more sub-carriers is greater than the threshold, the interferer is detected as occupying the same frequency associated with those one or more sub-carriers. The detection module 308 outputs 324 the interferer detection information to the MAC layer 310 so that transmissions on the one or more sub-carriers associated with the detected interferer can be suppressed.

Additionally, the mean of the NEVM function correlates highly to an inverse of the time domain SNR of the OFDM signal. Therefore, the mean of the NEVM function determined above provides an easy way to estimate the time domain SNR which can be used for other algorithms such as rate adaptation, antenna selection, and automatic gain control.

Figure 4:
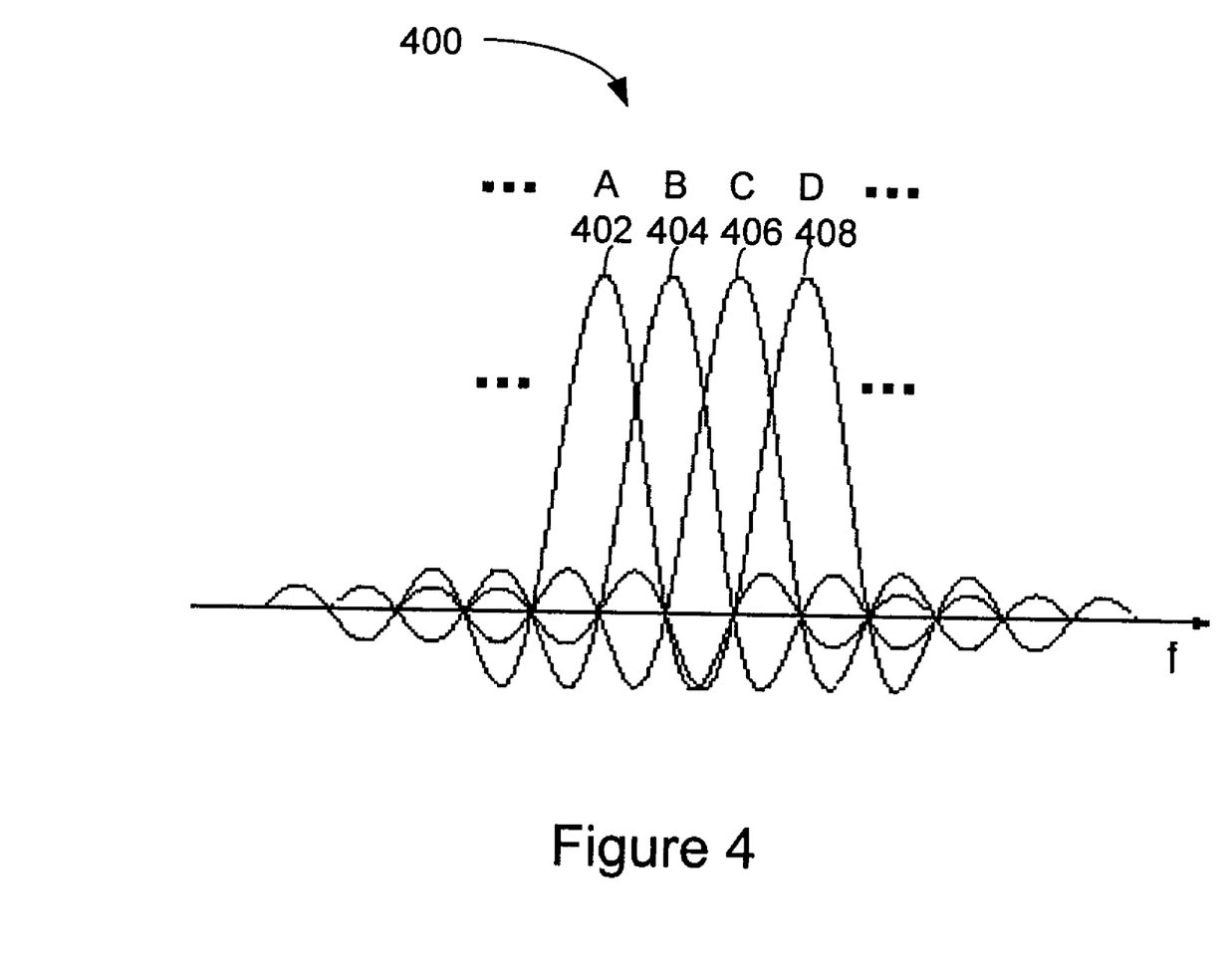
FIG. 4 is a diagrammatic representation of an OFDM signal that may be used as a carrier in the UWB system of FIG. 1.

FIG. 4 is a diagrammatic representation of an OFDM signal 400 that may be used as a carrier in the UWB system depicted in FIG. 1 in accordance with an embodiment. The OFDM signal 400 comprises a plurality of sub-carriers 402-408. Each sub-carrier 402-408 is modulated with a conventional modulation scheme, e.g., quadrature amplitude modulation, at respective data rates similar to single carrier modulation schemes in the same bandwidth. According to the theorems of the Fourier Transform the rectangular pulse shape will lead to a sin(x)/x type of spectrum of the sub-carriers as illustrated. The frequency spectrums of the sub-carriers are not separated but overlap. The reason why the information transmitted over the sub-carriers can be separated is the orthogonality relation. By using an IFFT for modulation, the spacing of the sub-carriers is chosen such that at the frequency where a received signal is evaluated (illustratively indicated by letters A-D in FIG. 4) all other signals are zero. The diagrammatic representation of OFDM signal 400 is greatly simplified, and OFDM signal 400 may include a large number, e.g., 128, sub-carriers for application in the UWB system. In the UWB system, the 128 sub-carriers include 100 data sub-carriers, 12 sub-carriers for pilot information, 10 sub-carriers for guard tones, and 6 sub-carriers for null tones carrying no information.

Figure 5:
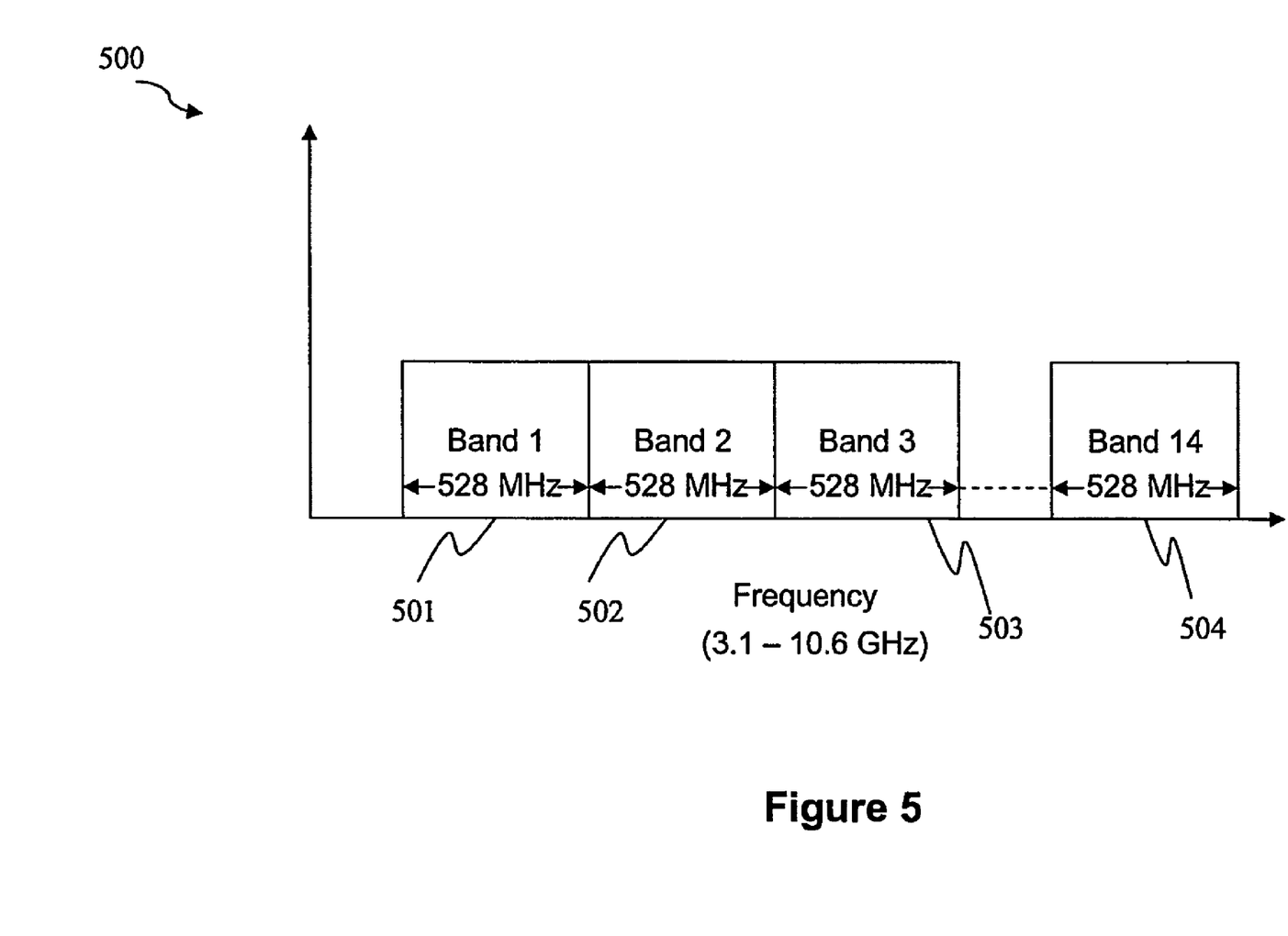

FIG. 5 is a diagrammatic representation of a plurality of bands in an UWB frequency spectrum 500 in which the UWB system of FIG. 1 may operate in. The UWB system utilizes an unlicensed frequency spectrum between 3.1 and 10.6 GHz. The UWB system includes a Physical (PHY) Layer that complies with standards such as WiMedia or ECMA-368/369. The PHY Layer divides the UVB spectrum 500 into fourteen bands 501-504, each with a bandwidth of 528 MHz. The fourteen bands 501-504 are further defined into five band groups, of which, four band groups each comprise three bands and one band group comprises two bands. Within each of the first four band groups, the PHY Layer defines four time frequency codes (TFC) using time frequency interleaving (TFI) and three TFC using fixed frequency interleaving (FFI), and thus, the PHY Layer provides support for up to seven channels per band. In the fifth band group, the PHY Layer defines two TFC using FFI. Accordingly, a total of thirty channels are specified in the PHY Layer.

Figure 6:
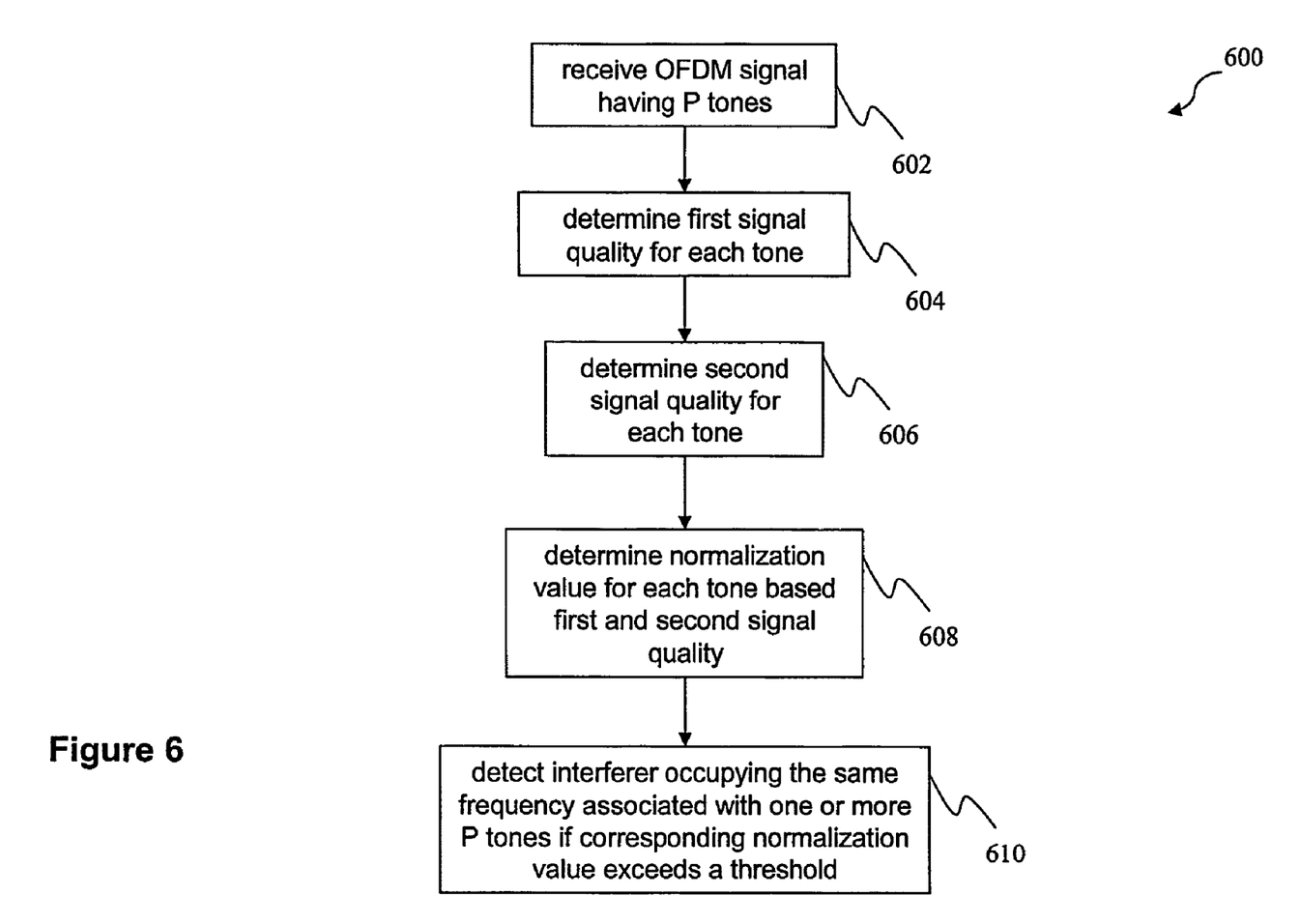
FIG. 6 is a flowchart of a method for detecting an interferer in an UWB system that may be implemented in the OFDM receiver subsystem of FIG. 3.

FIG. 6 is a flowchart of a method 600 for detecting an interferer in an UWB system that may be implemented in the detection module 318 of FIG. 3. The method 600 begins with block 602 in which an OFDM signal is received. The OFDM signal includes a plurality of P tones, each of the P tones being associated with a sub-carrier frequency. The method 600 continues with block 604 in which a respective first signal quality (such as the error vector magnitude, EVM) is determined for each of the P tones. The method 600 continues with block 606 in which in which a respective second signal quality (such as the channel frequency response magnitude, |CR|) is determined for each of the P tones. The method 600 continues with block 608 in which a respective normalization value is determined for each of the P tones. The respective normalization value is a function of the respective first signal quality and the respective second signal quality (such as the normalized EVM function, NEVM). The method 600 continues with block 610 in which the interferer that occupies the same frequency associated with one of the P tones is detected if the corresponding normalization value exceeds a threshold.

Figure 7:
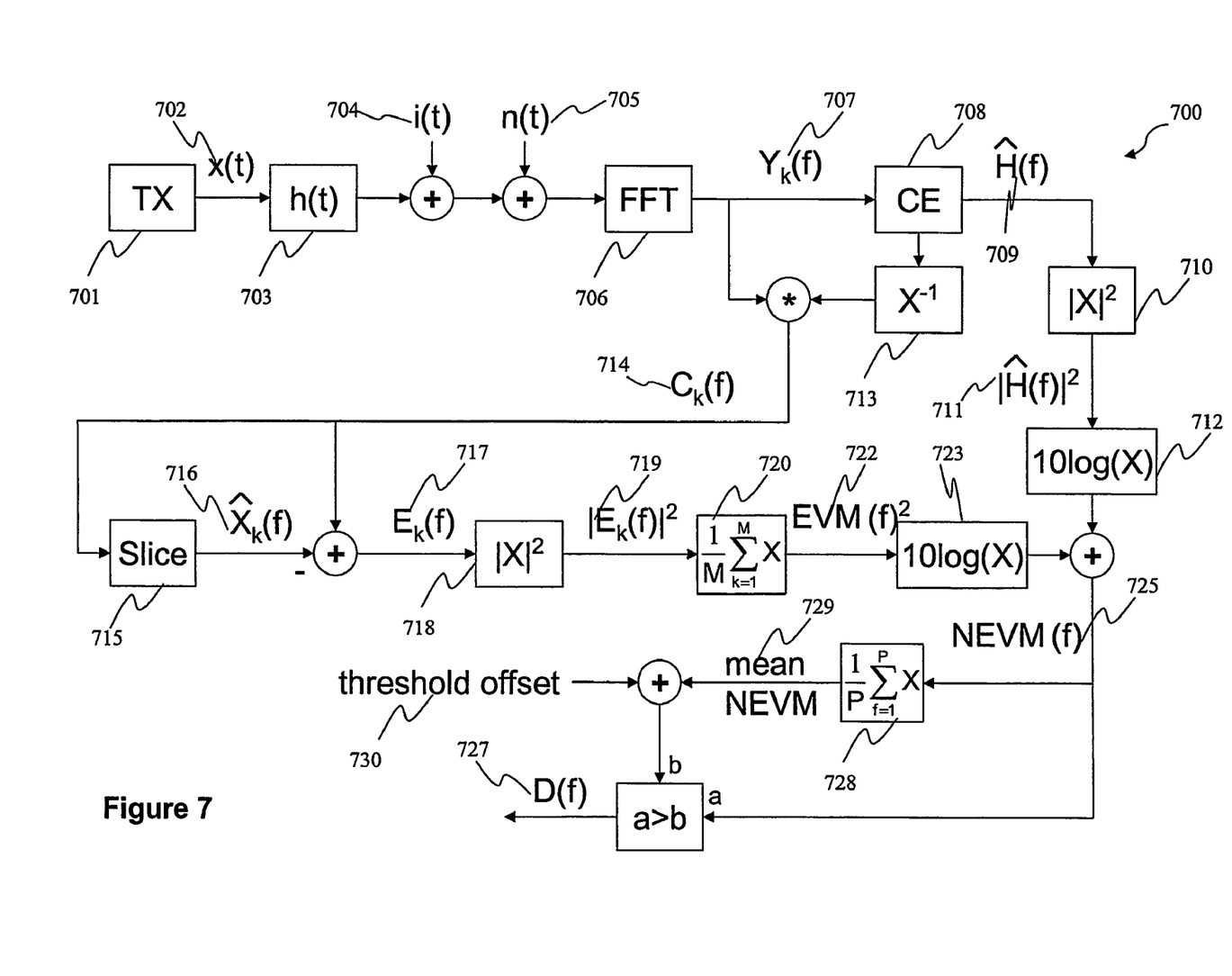
FIG. 7 is a block diagram of a detection algorithm for implementing the method of FIG. 6.

FIG. 7 is a block diagram of a detection algorithm 700 for implementing the method 600 of FIG. 6. The table below provides a list of references that are used in FIG. 7 and a brief description of the references.

| | |
|---|---|
| TX | OFDM transmitter |
| h(t) | multipath channel impulse response |
| H(f) | multipath channel frequency response |
| H hat(f) | estimate of H(f) |
| x(t) | time domain transmitted OFDM signal |
| X(f) | frequency domain transmitted OFDM signal per OFDM frequency bin |
| X hat(f) | estimate of X(f) based on hard decision slicer |
| i(t) | time domain interferer signal |
| I(f) | frequency response of the interferer signal |
| n(t) | Gaussian noise at the receiver due to thermal noise floor |
| $Y_k(f)$ | frequency response of the kth received OFDM symbol |
| $C_k(f)$ | channel compensated received signal for tone f, symbol k |
| $E_k(f)$ | error vector for tone f, symbol k |
| EVM(f) | error vector magnitude estimate per tone f |
| M | number of OFDM symbols to average E(f) over |
| P | number of energy carrying tones in the OFDM signal |
| NEVM(f) | normalized EVM per tone f |
| mean NEVM | mean value of NEVM(f) across all P tones |
| D(f) | interferer detection indication per tone f |

The algorithm 700 utilizes two signal quality metrics (i.e., multipath channel frequency response magnitude and error vector magnitude) of a received OFDM signal for detection of an interferer. For example, an OFDM transmitter (TX) 701 transmits an OFDM signal (x(t)) 702 over a radio channel in the UWB system of FIG. 1. The OFDM signal 702 includes a plurality of tones, each tone being associated with a sub-carrier frequency. The radio channel may be represented by its multipath channel impulse response (h(t)) 703 in the time domain. A victim service interferer is present and transmits an interferer signal (i(t)) 704. Further, a noise signal (n(t)) 705 is also present and represents the Gaussian noise due to thermal noise floor at the receiver. Accordingly, an OFDM receiver (such as the OFDM receiver subsystem 300 of FIG. 3) receives a signal that includes the OFDM signal 702, interferer signal 704, and noise signal 705 in the time domain. A FFT module 706 translates the received signal from the time domain to the frequency domain and an output ($Y_k$(f)) 707 of the FFT module 706 may be represented by the following equation:

$$Y_k(f) = X_k(f) \cdot H(f) + I_k(f) + N_k(f)$$

where $Y_k$(f) represents the frequency response of the $k^{th}$ received symbol, X(f) represents the transmitted OFDM signal per OFDM frequency bin, H(f) represents the multipath channel frequency response, I(i) represents the frequency response of the interferer signal, and N(f) represents the frequency response of the noise signal.

The output 707 of the FTT module 706 is inputted to a channel estimation module 708 that provides an estimate (H hat(f)) 709 of a multipath channel frequency response (H(f)). The estimate 709 may be represented by the following equation:

$$\hat{H}(f) = H(f) + e_H$$

where $e_H$ represents a channel estimation error. From the above, the multipath channel frequency response (H(f)) may be represented by the following equation:

$$H(f) = \hat{H}(f) - e_H \qquad 5$$

The estimate H hat(f) 709 is inputted to a function block 710 that provides a multipath channel frequency response magnitude squared ($|H\ hat(f)|^2$) 711 (i.e., $|CR|^2$). The channel frequency response magnitude squared 711 is inputted to a 10 log(X) function block 712 for translation into the dB domain. Further, the estimate H hat(f) 709 is inputted to an inverse function block 713 that provides an inverse of the estimate. The inverse of the estimate H hat(f) 709 is multiplied with the output 706 of the FTT module 707 to provide a channel compensated received signal for tone f, symbol k ($C_k(f)$) 714 which may be represented by the following equation:

$$C_k(f) = \frac{Y_k(f)}{\hat{H}(f)} = \frac{X_k(f) \cdot (\hat{H}(f) - e_H) + (I_k(f) + N_k(f))}{\hat{H}(f)} \qquad 20$$

Approximating $e_{HX}$=0, where $$e_{HX} = \frac{-X_k(f) \cdot e_H}{\hat{H}(f)}$$

Accordingly, the channel compensated received signal 714 may be approximated as:

$$C_k(f) \approx X_k(f) + \frac{(I_k(f) + N_k(f))}{\hat{H}(f)} \qquad 35$$

The channel compensated received signal $C_k(f)$ 714 is inputted to a hard decision slicer 715 which provides an estimate ($X\ hat(f)$) 716 of the transmitted OFDM signal and may be represented by the following equation:

$$\hat{X}_k(f) = \text{Slice}(C_k(f)) = \text{ArgMin}_i\{|C_k(f) - S_i|\},$$

$$S = \{S0, S1, S2, \dots\}$$

where S is the set of all possible symbols. An error vector ($E_k(f)$) 717 of tone f, symbol k may be represented by the following equation:

$$E_k(f) = C_k(f) - \hat{X}_k(f)$$

The error vector $E_k(f)$ 717 may be approximated by substituting the approximated channel compensated received signal 714 into the above equation as follows:

$$E_k(f) \approx \frac{(I_k(f) + N_k(f))}{\hat{H}(f)}$$

The error vector $E_k(f)$ 717 is inputted to a function block 718 which provides an error vector magnitude squared ($|E_k(f)|^2$) 719. The error vector magnitude squared 719 is inputted to an error vector magnitude (EVM) mean estimator 720 for averaging the error vector over a number (M) of OFDM symbols k. The $EVM^2$ 722 may be represented by the following equation:

$$EVM(f)^2 = E[|E(f)|^2] = \frac{E[|I(f)|^2]}{|\hat{H}(f)|^2} + \frac{E[|N(f)|^2]}{|\hat{H}(f)|^2}$$

The EVM squared 722 is inputted to a 10 log(X) function block 723 for translation to the dB domain. The output of function block 712 and the output of function block 723 are added, and thus a normalized EVM (NEVM(f)) 725 per tone f may be represented by the following equation:

$$NEVM(f) = 10\log(EVM(f)^2) + 10\log(|\hat{H}(f)|^2) = 10\log(EVM(f)^2 \cdot |\hat{H}(f)|^2)$$

Substituting the $EVM^2$ 722 into the equation above, the NEVM(f) 725 may be modified as follows:

$$NEVM(f) = 10\log(E[|I(f)|^2] + E[|N(f)|^2])$$

where the frequency response for the noise signal (N(f)) is constant. From the equation above, in the absence of an interferer signal, the NEVM(f) 725 is constant across frequency. In the presence of an interferer signal, the NEVM(f) 725 has a peak at those tones f that occupy the same sub-carrier frequency as the interferer. Accordingly, a detection function (D(f)) 727 per tone f may be represented by the following equation:

$$D(f) = 1, \text{ if}\left(NEVM(f) > \frac{1}{P}\sum_{f=1}^{P} NEVM(f) + \text{threshold\_offset}\right)$$

where P is a number of energy carrying tones in the OFDM signal and is used in function block 728 to calculate a mean of the NEVM function 729. Further, a threshold offset 730 is added to the mean of the NEVM function 729 and the sum may be used as a detection threshold. That is, the detection function D(f) 727 may indicate that an interferer is detected (i.e., D(f)=1) as occupying the same sub-carrier frequency associated with one of the tones if the NEVM(f) for that tone is greater than the detection threshold.

Figure 8:
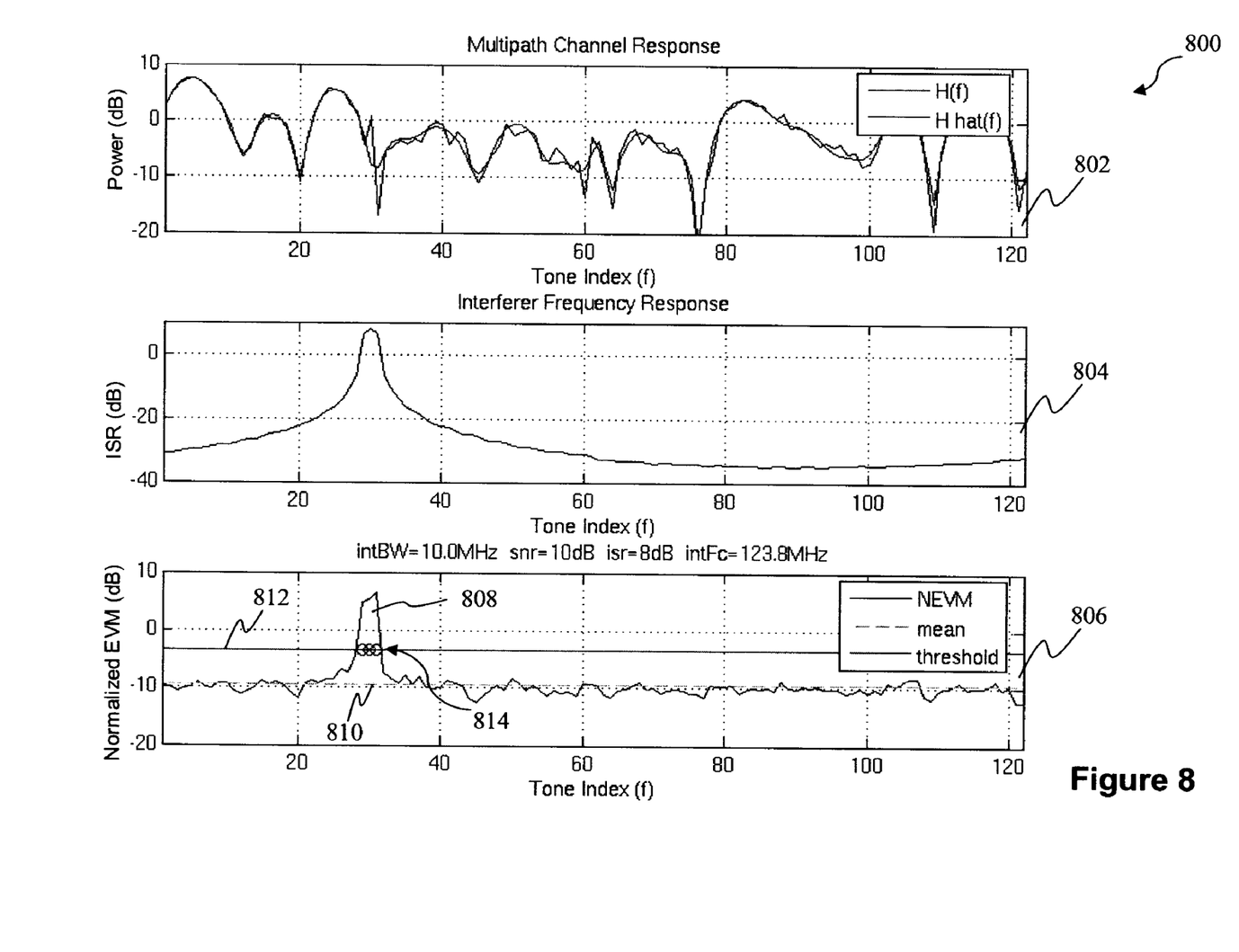
FIG. 8 are graphs illustrating an example of an interferer being detected using the detection algorithm of FIG. 7.

FIG. 8 are graphs 802, 804, 806 illustrating an example of an interferer being detected using the algorithm 700 of FIG. 7. In the example, an OFDM signal is transmitted in the presence of a victim service interferer. The interferer transmits an interferer signal. The OFDM signal is specified by the following parameters: an OFDM signal bandwidth of 510 MHz, OFDM signal having 122 energy carrying tones (sub-carriers), OFDM signal-to-noise ratio (SNR) of 10 db. The interferer signal is specified by the following parameters: interferer to signal power spectral density ratio (ISR) of 8 dB, interferer bandwidth of 10 MHz, and interferer center frequency of 123.8 MHz relative to the OFDM system center frequency. Further, 128 OFDM symbols are used to average an error vector (for the error vector magnitude EVM) over and a threshold offset of 6 dB is added to a mean of the NEVM for the detection threshold. The graphs 802, 804, 806 illustrate various responses (y-axis) across the 122 tones (x-axis) in the frequency domain.

The graph 802 shows a relationship of a power level (in dB) across the 122 tones (Tone Index (f)) for a multipath channel frequency response (H(f)) and an estimate of the multipath channel frequency response (H hat(f)). The graph 804 shows a relationship of the ISR (in dB) across the 122 tones (Tone Index (f)) of the interferer frequency response. The graph 806 shows a relationship of a normalized EVM (in dB) across the 122 tones (Tone Index (f)) as determined using the algorithm 700 of FIG. 7. In graph 806, the NEVM is shown by line 808, a mean of the NEVM is shown by line 810, and a detection threshold is shown by line 812. The mean of the NEVM 810 is calculated from 122 energy carrying tones. The detection threshold 812 is calculated by adding the threshold offset of 6 dB to the mean of the NEVM 810. Accordingly, an interferer is detected if the NEVM 808 for the corresponding tone index (f) is greater than the detection threshold 812. Therefore, an interferer is detected 814 as occupying the same sub-carrier frequency as tone indices 29, 30, and 31.

Figure 9:
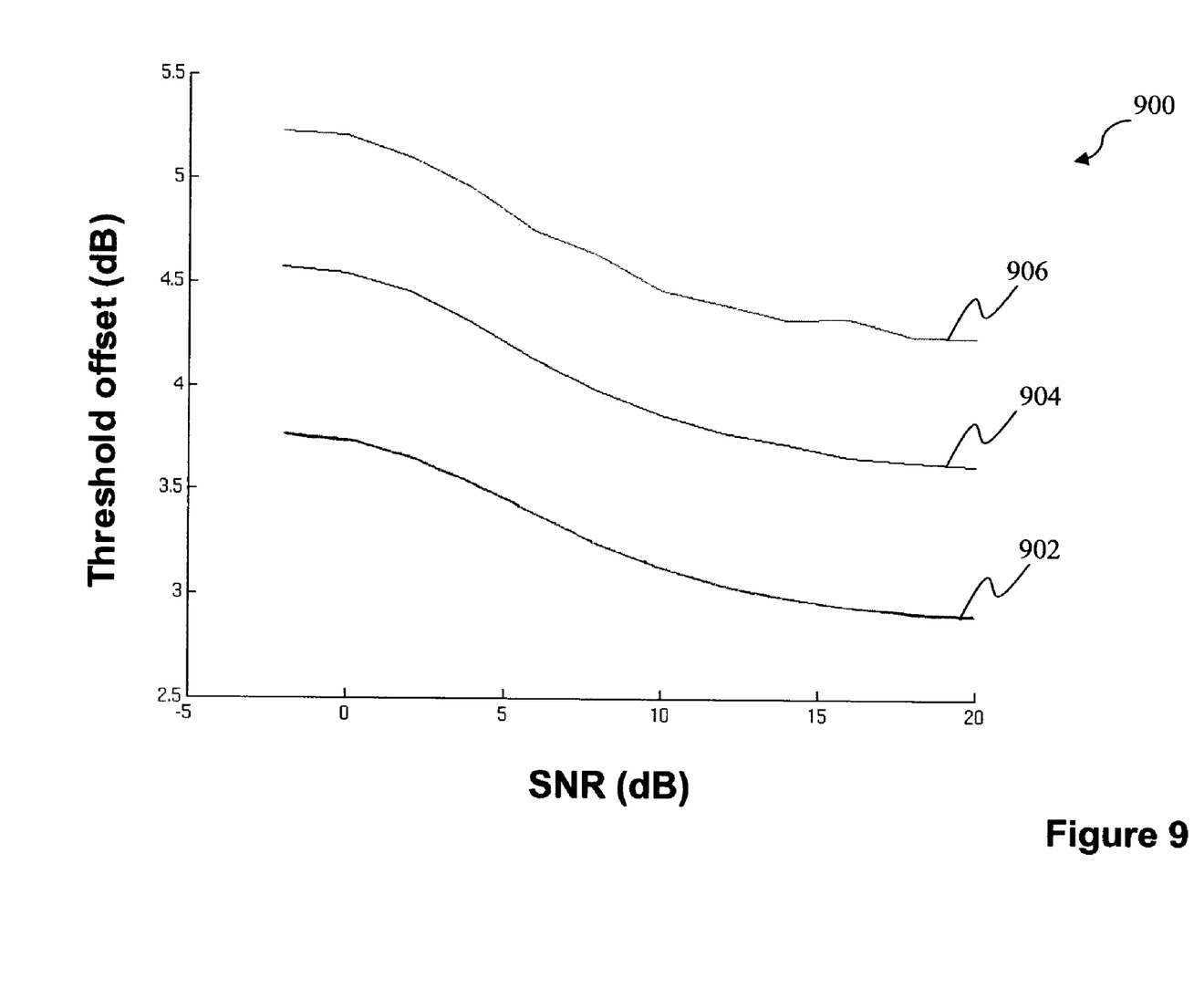
FIG. 9 is a graph illustrating probabilities of false interferer detection using the detection algorithm of FIG. 7.

FIG. 9 is a graph 900 illustrating probabilities of false interferer detection using the algorithm 700 of FIG. 7. The graph 900 shows a relationship between a threshold offset in dB and the OFDM signal-to-noise ratio (SNR) in dB for various false interferer detection probabilities. A curve 902 shows a false interferer detection probability of 0.1%, a curve 904 shows a false interferer detection probability of 0.01%, and a curve 906 shows a false interferer detection probability of 0.001%.

It has been observed that with a threshold offset of 6 dB the probability of false interferer detection can be kept below 0.0003%. Accordingly, increasing the threshold offset will further decrease the probability of false detection in a predictable way at a cost of increased probability of a missed detection. Also, it has been observed that using a threshold offset of 6 dB, the probability of missing all of the tone locations that contain the interferer is less than 1% for all ISR>6 dB and SNR>2 dB. The probability of missing some of the tone locations that contain the interferer is somewhat higher. However, low pass filtering the result can be used to fill in the missing tones to further decrease the probability of missing any of the tones.

Figure 10:
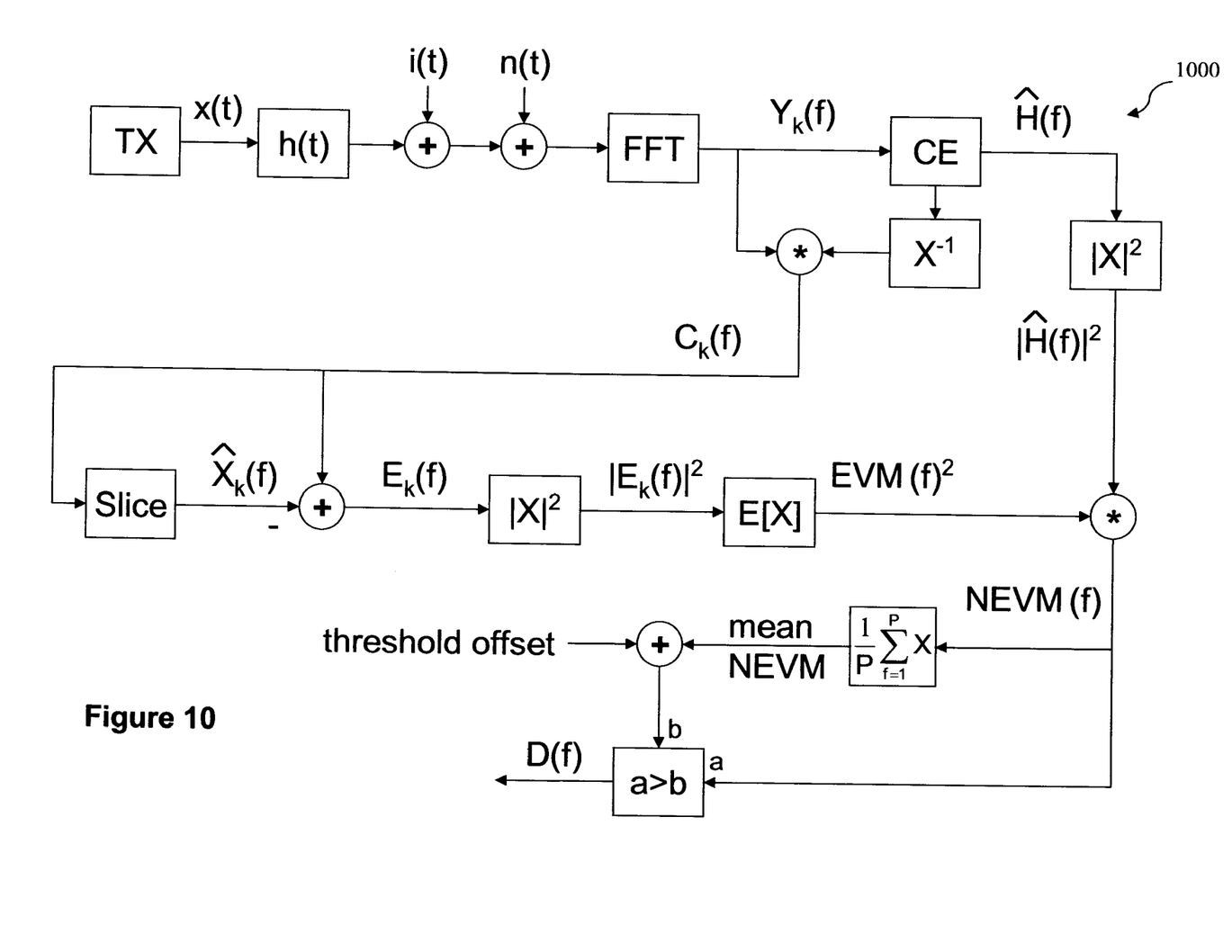
FIG. 10 is a block diagram of an alternative detection algorithm for implementing the method of FIG. 6.

FIG. 10 is a diagrammatic representation of an alternative detection algorithm 1000 for implementing the method 600 of FIG. 6. The algorithm 1000 is similar to the algorithm 700 of FIG. 7 except that algorithm 1000 does not use the 10 log(X) function to translate the NEVM function in the dB domain (to make it easier to relate thresholds to desired ISR detect levels). Instead, the algorithm 1000 takes out the 10 log(X) function and multiplies the EVM squared (EVM(f)$^2$) by the multipath channel frequency response magnitude squared (|H hat(f)|$^2$). The result is the NEVM function in the linear domain instead of the dB domain.

FIG. 11 is a flowchart of a method 1100 for a transmission suppression routine implemented in accordance with an embodiment. The suppression routine is executed (block 1102), and an evaluation may be made to determine if any evaluated tones have been identified as including interferers (block 1104). The methods disclosed herein for detecting the interferer may be used for the evaluation. If no tones have been identified as including interferers, the suppression routine may end (block 1110). If any tones have been identified as including interferers, the suppression routine may proceed to evaluate whether any of the interferer tones are within a known victim service band of any system (block 1106). If one or more of the interferer tones are within the victim service band, the suppression routine may attenuate or otherwise suppress transmissions from the UWB subsystem of the host device in the victim service band to avoid interfering with the victim service bands of the detected interferer (block 1108). The suppression routine may then end (block 1110).

The use of an interrupt mechanism can be useful for the PHY-MAC interface for interference signaling so that the MAC does not have to keep polling the PHY for interferer information and can do other tasks until interrupted by the PHY. In an embodiment, the PHY may interrupt the MAC only in the case of interference detection thereby reducing the amount of continuous interaction required from the MAC.

In another embodiment, MAC filtering of victim service interference information based on geographical location awareness may be provided. Victim services occupy different frequency bands in different countries. If the MAC has information about the country it is operating in and the licensed users in the frequency spectrum under consideration, the MAC may decide whether an interferer is an actual victim service interferer that needs to be avoided. Once a UWB device is taken into a different country, the software setting for the country could inform the MAC of the current victim frequency bands. If the detection algorithm on the PHY informs the MAC of a certain set of frequencies that have been detected, the MAC may correlate this information with the information provided by the software to check if it needs to take any action to avoid those frequencies or whether it can ignore those frequencies. To this end, the UWB system (or alternatively the host) may be configured with indicators of various victim service bands and corresponding geographic indicators in which the victim service band may be deployed. Thus, if the UWB system, or the host thereof, is able to obtain a geographic location indication, e.g., by a global positioning system, that indicates where the UWB device is currently located, the UWB system may then obtain victim service band information applicable to the particular location in which the UWB system is operating.

In other implementations, the UWB system may be located in a relatively fixed or non-mobile device, such as a set top box. In some instances, such UWB systems may be packaged for retail in a particular country or geographic region. Accordingly, the UWB system may be configured with an indication of the UWB system's intended geographic location usage and/or applicable victim service bands associated therewith. In this implementation, the UWB system may propagate knowledge of the UWB system location and/or spectrum of victim service bands to other devices, such as mobile UWB system devices.

It has previously been considered to propagate interference information to other devices in a network. However, this information is more useful if the reliability of the interference information is known. For example, if a UWB device is co-located with a victim service radio, e.g., computer laptop 130 featuring both a UWB subsystem for operation in WPAN 110 as well as a WiMax subsystem for operation in the WiMax system 150, the UWB device may pass that information in a MAC information element and the information about the victim service's activity can be passed as interference information, along with the fact that it came with an extreme confidence factor since the device was co-located. This information helps reduce the detection threshold at the receiver and improve the detection reliability of the network.

This information may be passed along, for example, using an information element on the MAC with some signaling information such as bits to indicate co-located radios and confidence/reliability factors. For example, a bit may be included in an information element that indicates a high reliability factor due to the fact that the UWB system is collocated with the victim service system. There are upper layer software controls which know that the victim radio is going to transmit soon and this information may be passed via software from the victim service device to the co-located UWB device. The UWB device may then transmit this information using the information element to other devices in the network with the location of the interference frequencies to avoid.

UWB devices, based on a multi-band operation mode, contain channels that do not use the band with interference. On detection of such interferers, the MAC can decide to use a channel that is interference free in accordance with an embodiment. If there are multiple free channels, the channel may be selected based on the best performance requirements for operation.

If there is a victim service that needs to be avoided, the MAC may use this information to go into a low power or sleep mode and decide to wake up after a time-out period for the interferer to have completed transmission. The time-out period can be made programmable in the MAC and may depend on regulations in different countries.

Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like. Embodiments disclosed herein have been provided with reference to UWB systems. However, implementations of embodiments disclosed herein are not limited to any particular radio frequency system. Rather, embodiments disclosed herein may be implemented in any radio frequency system in which radio spectrum is shared by multiple systems and in which devices may utilize sub-carrier channels for effecting radio frequency transmissions.

Further, embodiments disclosed herein provide a method and system for detecting interferers using estimates of an error vector magnitude and a channel response magnitude. However, the method and system can be implemented in any communication system wherein a signal quality metric can be determined in two or more ways. Accordingly, other signal quality metrics may be used instead of the error vector magnitude and channel response magnitude. Thus, the two signal quality metrics that are selected behave differently in the presence of an interferer, and discrepancies in the behavior of these two metrics are identified. The discrepancies indicate the presence of the interferer.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments of the invention may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure. For example, the EVM mean estimator may be implemented as an infinite impulse response (IIR) filter and thus can be used to estimate the mean of the EVM distribution. Also, the embodiments disclosed herein may be applied to any OFDM system with any number of sub-carriers (P tones) and may be used to detect victim service interferers whose bandwidth is less than the bandwidth of the OFDM signal.

What is claimed is:

1. A method for detecting an interferer in a wireless communication system, the method comprising:
   receiving a signal having a plurality of pilot (P) tones, each of the P tones being associated with a frequency;
   determining a respective first signal quality for each of the P tones;
   determining a respective second signal quality for each of the P tones; and
   detecting the interferer that occupies the same frequency associated with one of the P tones based on the respective first signal quality and the respective second signal quality;
   wherein the first signal quality and second signal quality behave differently when the interferer is present, and wherein the detecting the interferer includes determining a discrepancy in the behavior of the first signal quality and the second signal quality.

2. The method of claim 1, wherein the determining the first signal quality includes determining an error vector magnitude (EVM), the EVM being an error measurement of the received tone.

3. The method of claim 2, wherein the determining the second signal quality includes determining a channel frequency response magnitude ($|CR|$), the $|CR|$ being a magnitude of a channel frequency response of the received tone.

4. The method of claim 3, wherein the detecting the interferer includes:
   determining a respective normalization value for each of the P tones, the normalization value being a function of the first signal quality and the second signal quality; and
   identifying the interferer that occupies the same frequency associated with one of the P tones if the corresponding normalization value exceeds a threshold;
   wherein the function of the first signal quality and second signal quality equals $EVM^2 * |CR|^2$.

5. The method of claim 4, wherein the threshold is determined by adding an offset to a mean of the normalization values of the plurality of P tones.

6. The method of claim 1, wherein the receiving the signal includes receiving an orthogonal frequency division multiplexed (OFDM) signal in an ultra wideband (UWB) system, each of the P tones being associated with a sub-carrier frequency.

7. The method of claim 6, further comprising responsive to detecting the interferer, attenuating transmissions by the UWB system within the sub-carrier frequency occupied by the interferer.

8. The method of claim 6, further comprising generating by a PHY layer of the UWB system an interrupt to notify an upper layer of the ultra wideband system that the interferer has been detected.

9. The method of claim 1, wherein the method for detecting the interferer is performed during normal packet reception without a silent period.

10. A non-transitory computer-readable medium having computer-executable instructions for execution by a processing system, the computer-executable instructions for detecting an interferer in a wireless communication system, comprising:

instructions that receive a signal having a plurality of pilot (P) tones, each of the P tones being associated with a frequency;

instructions that determine a respective first signal quality for each of the P tones;

instructions that determine a respective second signal quality for each of the P tones; and instructions that detect the interferer that occupies the same frequency associated with one of the P tones based on the respective first signal quality and the respective second signal quality;

wherein the first signal quality and second signal quality behave differently when the interferer is present, and wherein the instructions that detect the interferer includes instructions that determine a discrepancy in the behavior of the first signal quality and the second signal quality.

11. The non-transitory computer-readable medium of claim 10, wherein the instructions that determine the first signal quality includes instructions that determine an error vector magnitude (EVM), the EVM being an error measurement of the received tone.

12. The non-transitory computer-readable medium of claim 11, wherein the instructions that determine the second quality metric includes instructions that determine a channel frequency response magnitude (|CR|), the |CR| being a magnitude of a channel frequency response of the received tone.

13. The non-transitory computer-readable medium of claim 12, wherein the instructions that detect the interferer include:

instructions that determine a respective normalization value for each of the P tones, the normalization value being a function of the first signal quality and the second signal quality; and instructions that identify the interferer that occupies the same frequency associated with one of the P tones if the corresponding normalization value exceeds a threshold;

wherein the function of the first signal quality and second signal quality equals $EVM^2 * |CR|^2$.

14. The non-transitory computer-readable medium of claim 10, wherein the instructions that receive the signal includes instructions that receive an orthogonal frequency division multiplexed (OFDM) signal in an ultra wideband (UWB) system, each of the P tones being associated with a sub-carrier frequency.

15. The non-transitory computer-readable medium of claim 10, wherein the instructions for detecting the interferer are performed during normal packet reception without a silent period.

16. A system for detecting an interferer in an ultra wideband (UWB) system, comprising:

an antenna adapted to receive an OFDM signal having a plurality of pilot (P) tones, each of the N tones being associated with a frequency;

a Fast Fourier Transform (FTT) module adapted to translate the received signal into a frequency domain;

a demodulator for demodulating the translated signal, the demodulator providing a respective first signal quality of each of the P tones and a respective second signal quality of each of the P tones; and a detection module configured to detect the interferer that occupies the same frequency associated with one of the P tones if a corresponding normalization value exceeds a threshold, the respective normalization value of each of the P tones being a function of the respective first signal quality and respective second signal quality.

17. The system of claim 16, wherein the first signal quality includes an error vector magnitude (EVM), the EVM being an error measurement of the received tone.

18. The system of claim 17, wherein the second quality metric includes a channel response frequency magnitude (|CR|), the |CR| being a magnitude of a channel frequency response of the received tone.

19. The system of claim 18, wherein the function of the first signal quality and second signal quality equals $EVM^2 * |CR|^2$.

20. The system of claim 19, wherein the threshold includes a sum of an offset and a mean of the normalization values of the plurality of P tones.

* * * * *